United States Patent Office 2,980,702
Patented Apr. 18, 1961

2,980,702

HEAT RESISTANT DERIVATIVES OF L-ASCORBIC ACID

Jan Thesing and Roland Helger, Darmstadt, Germany, assignors to E. Merck Aktiengesellschaft, Darmstadt, Germany, a corporation of Germany No Drawing. Filed Nov. 5, 1959, Ser. No. 850,986

Claims priority, application Germany Nov. 15, 1958

2 Claims. (Cl. 260—343.7)

This invention relates to novel derivatives of L-ascorbic acid.

It is an object of this invention to provide heat resistant derivatives of L-ascorbic acid.

It is a further object of this invention to provide heat resistant derivatives of L-ascorbic acid which exhibit the full activity of vitamin C and are easily broken down in the organism.

L-ascorbic acid (vitamin C) is a very reactive compound which is easily oxidizable and extremely sensitive to heat.

In the manufacture of food-stuffs, heating is necessary in many processes, for instance baking or sterilization. In such processes, the vitamin C contained in or added to the food-stuffs is broken down to physiologically inactive products.

According to the present invention, a physiologically well tolerated derivative of ascorbic acid can be produced by a simple technical process of manufacture. This derivative is stable to heat and is readily converted into vitamin C in the body.

The derivatives of L-ascorbic acid known in the literature heretofore do not meet the above requirements. For instance, many of the known derivatives of vitamin C form break down products in the organism which are not completely safe physiologically. The latter are mainly esters of ascorbic acid containing aromatic groups (cf. for example Journal of Biological Chemistry, vol. 152, p. 585 (1944), and vol. 161, p. 285 (1945), German Patent No. 701,561, U.S. Patent Nos. 2,454,747–9). Another portion of the known derivatives of ascorbic acid does not possess vitamin activity (cf. Journal of Biological Chemistry, vol. 161, p. 285 (1945)). In the German Patent No. 639,776 the preparation of the vitamin C palmitic acid ester is described. This ester, however, is only obtained in a very poor yield. The same applies to the preparation of the tetraacetate of L-ascorbic acid, described in Chemical Abstracts, vol. 46, col. 10106 (1952).

It has been found that esters of L-ascorbic acid meeting all requirements set forth above are obtained by condensation of L-ascorbic acid, or a derivative of vitamin C having groups being hydrolyzable to OH in the 5 and 6 position, or a salt of such compounds, with an alkyl ester of chloro- or bromoformic acid in an alkaline medium. Preferably alkyl esters with an alkyl radical of from 1 to 3 carbon atoms are employed. As a hydrolyzable group in the 5 and 6 position of ascorbic acid the isopropylidene radical is suitable.

The process of the invention may be characterised by the following scheme:

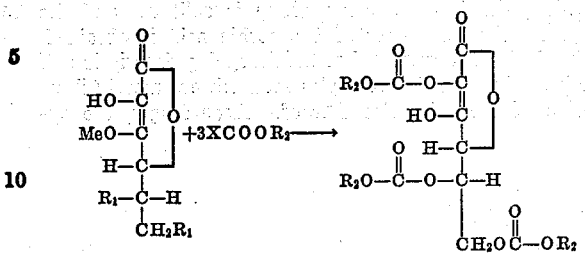

wherein

X is Cl or Br

Me is hydrogen or the cation of an organic or inorganic acid.

$R_1$ is OH or a group hydrolyzable to OH $R_2$ is an alkyl group having from 1 to 3 carbon atoms.

The agent of esterification is preferably an alkyl ester of chloroformic acid because these are more easily obtained than the bromoformic acid esters. The use of chloroformic acid ethyl ester has been found to be particularly advantageous. The process may be carried out in the presence of all bases usually employed in esterifications. Thus, organic bases, such as pyridine, lutidine, collidine, etc., can be used.

According to this invention, the following esters of L-ascorbic acid can be obtained:

2,5,6-tricarbmethoxy ester of L-ascorbic acid
2,5,6-tricarbethoxy ester of L-ascorbic acid
2,5,6-tricarbpropoxy ester of L-ascorbic acid The novel 2,5,6-tricarbalkoxy esters of ascorbic acid are stable on storage. In a strongly acid or alkaline medium they are saponified to ascorbic acid. In the organism, these novel derivatives of ascorbic acid are easily and completely converted into L-ascorbic acid so that in the human body they exhibit the full physiological activity of vitamin C. Thus, for instance, the 2,5,6-tricarbethoxy ester of L-ascorbic acid is broken down in the body to L-ascorbic acid and to the physiological compounds $CO_2$ and ethanol.

The novel derivatives of ascorbic acid are heat resistant in the usual sterilization processes. They are further suitable for the vitamination of heat-processed food-stuffs. They are, for instance, suitable for the vitamination of dough being almost completely heat resistant in the baking process. In tests, at least 90% of the derivative of L-ascorbic acid according to this invention added to the dough before baking could be recovered in the bread after the baking process.

The novel compounds of this invention are therefore valuable derivatives of vitamin C which may be employed wherever a heat resistant derivative of L-ascorbic acid is required.

*Examples*

(1) To a solution of 35 g. of L-ascorbic acid in 200 ml. of pyridine there are added while stirring at a temperature of 0 to 5° C. 70 ml. of chloroformic acid ethyl ester in 800 ml. of acetone. The mixture is stirred for another two hours at room temperature. Then gaseous HCl is introduced at 0 to 5° C. until a clear solution is obtained. Then water is added and the separated oil is dissolved in chloroform. The chloroform solution is shaken with a saturated solution of NaHCO$_3$ and the two layers formed are separated. The aqueous solution is acidified while being cooled with a concentrated solution of hydrogen chloride and then extracted with ether. The ethereal layer yields 34 g. (86%) of a light yellow syrup which crystallizes. Upon recrystallization from a mixture of benzene and carbon tetrachloride, the melting point of the 2,5,6-tricarbethoxy ester of L-ascorbic acid is 96 to 97° C.

(2) In an analogous process, 5,6-isopropylidene ascorbic acid is used instead of L-ascorbic acid. During the reaction, the isopropylidene group is split off and the 2,5,6-tricarbethoxy ester of L-ascorbic acid is obtained.

It will be understood that the foregoing description of the invention and the examples set forth are merely illustrative of the principles thereof. Accordingly, the appended claims are to be construed as defining the invention within the full spirit and scope thereof.

We claim:

1. Compounds of the formula

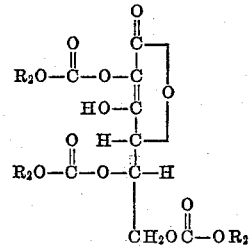

wherein R is an alkyl radical having from 1 to 3 carbon atoms.

2. The 2,5,6-tricarbethoxy ester of L-ascorbic acid.

No reference cited.